United States Patent
Li et al.

(10) Patent No.: US 12,442,486 B2
(45) Date of Patent: Oct. 14, 2025

(54) EXTENDABLE SUPPORT LEG

(71) Applicant: Guangdong Sirui Optical Co., Ltd., Zhongshan (CN)

(72) Inventors: Jie Li, Zhongshan (CN); Fan Xiao, Zhongshan (CN)

(73) Assignee: Guangdong Sirui Optical Co., Ltd., Zhongshan (CN)

( * ) Notice: Subject to any disclaimer, the term of this patent is extended or adjusted under 35 U.S.C. 154(b) by 64 days.

(21) Appl. No.: 18/520,193

(22) Filed: Nov. 27, 2023

(65) Prior Publication Data
US 2024/0337348 A1 Oct. 10, 2024

(30) Foreign Application Priority Data

Apr. 6, 2023 (CN) .......................... 202310366654.5
Apr. 6, 2023 (CN) .......................... 202320754150.6

(51) Int. Cl.
*F16M 11/32* (2006.01)
*G03B 17/56* (2021.01)

(52) U.S. Cl.
CPC ........... *F16M 11/32* (2013.01); *G03B 17/561* (2013.01); *F16M 2200/025* (2013.01)

(58) Field of Classification Search
CPC . F16M 11/32; F16M 2200/025; G03B 17/561
See application file for complete search history.

(56) References Cited

U.S. PATENT DOCUMENTS

| 5,011,104 A * | 4/1991 | Fang ................... F16M 11/28 248/161 |
| 5,433,551 A * | 7/1995 | Gordon .................. F16B 7/149 403/368 |
| 5,492,430 A * | 2/1996 | Jones .................... F16B 7/149 403/109.5 |
| 8,506,200 B2 * | 8/2013 | Lu ........................ F16B 7/1463 403/109.5 |

(Continued)

FOREIGN PATENT DOCUMENTS

| CN | 106763039 A * | 5/2017 | ............ F16B 7/1463 |
| CN | 113090903 | 7/2021 | |

(Continued)

OTHER PUBLICATIONS

Kingjoy product catalog page for M series for video monopod http://www.kingjoyusa.com/en/pro_show.asp?id=117 (Year: 2020).*

(Continued)

*Primary Examiner* — Terrell L Mckinnon
*Assistant Examiner* — Ding Y Tan
(74) *Attorney, Agent, or Firm* — Loeb & Loeb LLP (57) ABSTRACT

Aspects of the invention disclose a telescopic support leg, which includes a top leg tube, a middle leg tube and an bottom leg tube that are arranged sequentially from outside to inside. A first locking member includes a movable tube and a limiting plate, with a middle inner brace and an outer brace. A second locking member includes an inner tube and an elastic sleeve. The middle leg tube is secured to the inner support while moving relative to the inner tube, thereby (Continued)

allowing the elastic sleeve to function as the inner tube lock the outer wall of the bottom leg tube or loosen the elastic sleeve and the inner tube of the bottom leg tube.

18 Claims, 4 Drawing Sheets

(56) References Cited

U.S. PATENT DOCUMENTS

| | | | |
|---|---|---|---|
| 10,247,353 B1* | 4/2019 | Chen | F16B 2/12 |
| 10,288,196 B2* | 5/2019 | Hu | F16L 9/14 |
| 11,089,860 B2* | 8/2021 | Paratore | F16B 7/1418 |
| 2019/0101239 A1* | 4/2019 | Li | G03B 17/561 |
| 2020/0217447 A1* | 7/2020 | Johnson, Sr. | F16B 7/149 |
| 2021/0310606 A1* | 10/2021 | Johnson, Sr. | F16M 11/32 |
| 2023/0288017 A1* | 9/2023 | Johnson, Sr. | F16M 11/32 |
| 2025/0109819 A1* | 4/2025 | Liang | G03B 17/561 |

FOREIGN PATENT DOCUMENTS

| | | | | |
|---|---|---|---|---|
| CN | 113090903 A | * | 7/2021 | F16B 7/1463 |
| CN | 214790255 U | * | 11/2021 | F16M 11/04 |
| CN | 215060975 U | * | 12/2021 | F16B 7/1463 |
| CN | 113090903 B | * | 11/2022 | F16B 7/1463 |
| EP | 2881598 | | 6/2015 | |
| GB | 707839 | | 4/1954 | |
| WO | 2007073805 | | 7/2007 | |
| WO | WO-2007073805 A1 | * | 7/2007 | F16M 11/28 |
| WO | 2022206157 | | 10/2022 | |

OTHER PUBLICATIONS

Tycoon villa youtube video titled Top 5 best travel tripod for photography 2021, https://www.youtube.com/watch?v=F7_WoitO1oU (Year: 2021).*
Extended European Search Report issued in App. No. EP23212747, dated Jun. 6, 2024, 7 pages.

* cited by examiner

EXTENDABLE SUPPORT LEG

TECHNICAL FIELD

The present invention generally relates to a technical field of photographic equipment. In particular, aspects of the invention are directed to an extendable support leg.

BACKGROUND

Camera tripods include tripods and monopods, which are used to stabilize the camera. They can help users stabilize their positioning in star track photography, nature photography, night scene photography, macro photography, etc., and prevent the camera from seeing jittering while moving during shooting so as to ensure the effect of the shot. A tripod is better than a monopod in terms of stability, and a monopod is better than a tripod in terms of portability and flexibility of use. However, whether it is a tripod or a monopod, in order to adapt to the shooting angle requirements, they all have support legs that can be telescopically adjusted. When adjusting the support legs of traditional support tripods, they usually use multi-point independent adjustment to adjust the support legs section by sections. The height of the support leg is adjusted step by step. The operation of this support leg is more complicated and the adjustment is slow.

SUMMARY

Therefore, aspects of embodiments of the invention attempt to solve the technical problem associated with a telescopic support leg in the prior art, which has the disadvantages of complicated operation and slow adjustment of the support legs of the support tripod.

In order to solve the above technical problems, the technical solutions proposed by the embodiments of the present invention may include:

In one embodiment, a telescopic support leg, including a top leg tube, a middle leg tube and a bottom leg tube that are arranged sequentially from outside to inside and are axially telescopic; the middle leg tube and the top leg tube are relatively circumferentially fixed or secured.

In another embodiment, a locking control member is installed at one end of the top leg tube and includes a rotating rod with one end extending into the top leg tube and being rotatable;

In another embodiment, a first locking member includes a movable tube, a limiting plate, an inner brace, and a support brace located in the top leg tube;

In one embodiment, the movable tube may be connected to the rotating rod, and may be circumferentially fixed and axially sliding relative to the rotating rod. The limiting plate may be fixed on the outer periphery of the movable tube. The inner support may be connected to the middle leg tube and may be fixedly connected via threads to the outer periphery of the movable tube. In another embodiment, the support brace may be axially fixed relative to the limiting plate and may be located outside the inner brace, and the support brace may be in the inner brace and may be in a tightened state that holds the inner wall of the top leg tube. In another embodiment, the support brace may be in a loose state that is separated from the inner wall of the top leg tube.

In yet another embodiment, a second locking member includes an inner tube relatively axially fixedly connected to the movable tube and located inside the middle leg tube while sleeved on the outer periphery of the bottom leg tube and fixedly connected to the middle leg tube. In one embodiment, the inner tube may move relative to an elastic sleeve in the axial direction, and the elastic sleeve may be in a locking state that partially extends into the inner tube to lock on the outer wall of the bottom leg tube, and may be in a locking state with the outer wall of the bottom leg tube. In one embodiment, the inner tube may be separated to release the released state of the bottom leg tube.

In yet a further embodiment, the inner brace may include a cone section, and the outer wall of the cone section has an outer conical slope. In one embodiment, the support brace may include at least two mutually independent inner support blocks. In another embodiment, the inner wall of the support blocks may include an inner tapered bevel, and the outer tapered bevel matches the inner tapered bevel.

In another embodiment, the outer wall of the brace is provided with a mounting groove, and an elastic member is provided in the mounting groove to be elastically supported between the brace and the outer wall of the top leg tube.

In yet another embodiment, the inner wall of the limiting plate may be provided with an annular groove, and the supporting member may be provided with a buckle that extends into the annular groove. In one embodiment, the buckle may be in contact with the side wall of the annular groove, cooperating to achieve relative axial fixation with the limiting plate.

Further, in one embodiment, the inner brace also includes a cylindrical section, which extends into the middle leg tube and is fixedly connected to the middle leg tube.

Further, in one embodiment, the outer periphery of the lower end of the movable tube is fixedly connected to a limiting plate. The outer periphery of the limiting plate may include an annular limiting groove, and the upper end of the inner tube is connected to an inner tube connector. In one embodiment, the inner tube connector may be a limiting block that may extend into the annular limiting groove to achieve axial fixation relative to the limiting plate.

Further, in one embodiment, a locking sleeve is fixedly connected to the outer wall of the lower end of the inner tube. The inner wall of the locking sleeve may include an inner inclined guide surface. In one embodiment, the outer wall of the elastic member may include an outer inclined guide surface. The inner inclined guide surface may match the outer inclined guide surface.

Further, in one embodiment, the outer wall of the elastic member may include an annular slot. In one aspect, the lower end outer wall of the middle leg tube is fixedly connected with a connecting sleeve, and the lower end inner wall of the connecting sleeve is provided with a clamping block that extends into the annular slot. In one aspect, the clamping block may cooperate with the groove side wall of the annular clamping groove to achieve relative axial fixation with the elastic member.

Furthermore, in one embodiment, a notch m be on the side wall of the elastic member, and the notch extends from the middle of the side wall of the elastic member to the end of the side wall.

Further, in one embodiment, a first anti-slip component is provided between the top leg tube and the middle leg tube, and a second anti-slip component is provided between the middle leg tube and the inner tube. A third anti-slip component is provided between the inner tube and the bottom leg tube.

The technical solution of aspects of the invention has the following advantages:

1. The telescopic support leg provided by aspects of the invention may include an axially telescopic and relatively circumferentially fixed top leg tube, a middle leg tube and an bottom leg tube. The top leg tube, the middle leg tube and the bottom leg tube do not rotate relative to each other during relative extension and contraction. In one aspect, a first locking member may rotate a rotating rod to move an inner brace up and down relative to a support brace and the movable tube, thereby causing the support brace to tighten the top leg tube under the action or force of the inner brace. The inner wall of the middle leg tube may be used to tighten and lock the position of the middle leg tube or be separated from the inner wall of the top leg tube to loosen the lock on the middle leg tube. The middle leg tube may be fixedly connected to the inner brace, and the inner tube is axially fixedly connected to the movable tube, and the middle leg tube can move up and down relative to the inner tube. An elastic sleeve set on the outer periphery of the bottom leg tube may be fixedly connected to the middle leg tube to move up and down relative to the inner tube, thereby causing the elastic sleeve to lock the bottom leg under the action of the inner tube. The outer wall of the tube or elastic sleeve may be separated from the inner tube to loosen the bottom leg tube. With this arrangement, just by turning the rotating rod, the first locking member and the second locking member may respectively lock and secure the middle leg tube and the bottom leg tube at the same time or loosen and release the middle leg tube and the bottom leg at the same time. The tube may be used to release and fix the support legs with one button, which is simple to operate and effectively improves the telescopic adjustment speed of the support legs.

BRIEF DESCRIPTION OF THE DRAWINGS

In order to more clearly illustrate the specific embodiments of the present application or the technical solution in the prior art, the following will be a brief introduction to the drawings required in the specific embodiment or prior art description, obviously, the drawings described below are some embodiments of the present application, for those skilled in the art, without the premise of creative labor, may also obtain other drawings according to these drawings. Embodiments are now described, by way of example only, with reference to the accompanying drawings, in which.

Descriptions of the reference identifiers: 1. top leg tube; 2. middle leg tube; 3. bottom leg tube; 4. first locking member; 41. movable tube; 42. limiting plate; 421. annular groove; 43. inner brace; 44. support brace; 441. annular slot; 442. buckle; 45. elastic member; 46. limiting turning piece; 461. annular limiting groove; 5. second locking member; 51. inner tube; 52. elastic sleeve; 521. annular slot; 53. inner pipe connector; 531. limiting block; 54. locking sleeve; 55. connecting sleeve; 551. clamping block; 6. first anti-slip component; 7. second anti-slip component; 8. third anti-slip component; 9. locking control component; 91. installation sleeve; 92. latch.

DETAILED DESCRIPTION

The technical solution of the aspects of the invention will be clearly and completely described below in conjunction with the accompanying drawings. Obviously, the described embodiments are some embodiments of the present application, not all embodiments. Based on the embodiments in the present application, all other embodiments obtained by those of ordinary skill in the art without performing creative labor fall within the scope of protection of the present application.

In the description of the present application, it should be noted that the orientation or position relationship indicated by the terms "center", "up", "top", "down", "bottom," "end," "left", "right", "vertical", "horizontal", "inside", "outside" and so on is based on the orientation or position relationship shown in the drawings, only to facilitate the description of the present application and simplify the description, not to indicate or imply that the device or element referred to must have a specific orientation, constructed and operated in a specific orientation, so it cannot be understood as a limitation of the present application. In addition, the terms "first", "second", "third" are for descriptive purposes only and cannot be understood as indicating or implying relative importance.

In the description of the present application, it should be noted that, unless otherwise expressly provided and qualified, the terms "installation", "connection", "connection" should be understood in a broad sense, for example, may be secured connection, may be detachable connection, or integrated connection; may be mechanical connection, or electrical connection; may be directly connected, or indirectly connected through an intermediate medium, may be internal connection of two elements. For those of ordinary skill in the art, the specific meaning of the above terms in the present application may be understood in a case-by-case situation.

Further, the technical features involved in different embodiments of the present application described below may be combined with each other as long as they do not constitute a conflict with each other.

Figure 1:
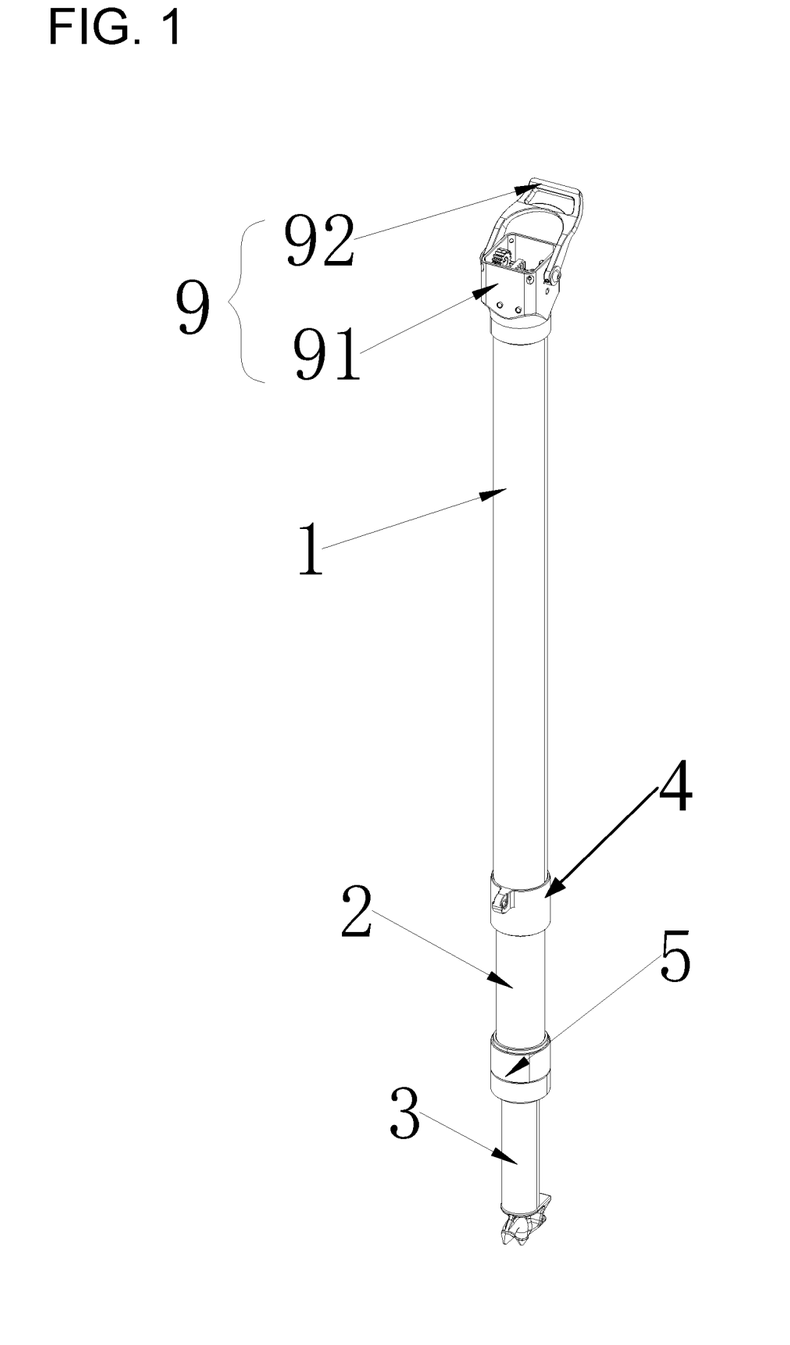
FIG. 1 is a perspective view of a telescopic support leg of a tripod in an embodiment of the present invention.
Figure 2:
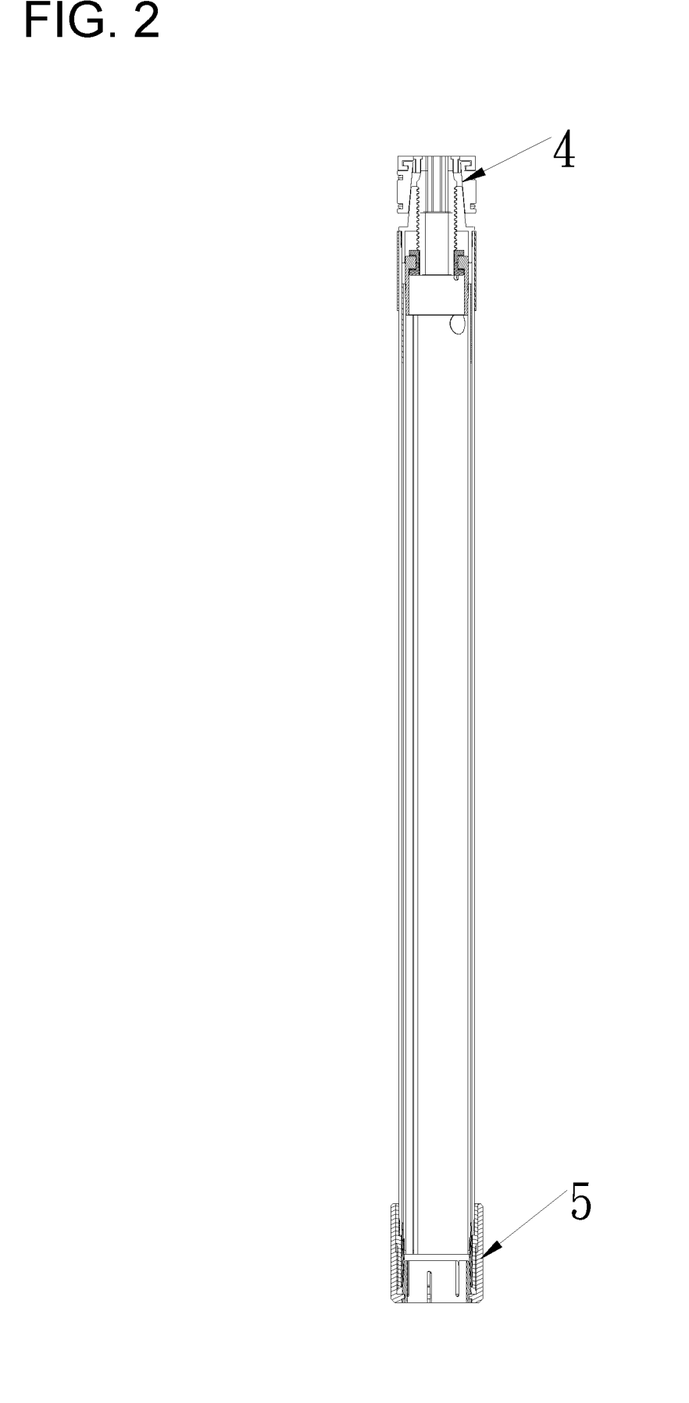
FIG. 2 is a cross-section view of the telescopic support leg in an embodiment of the present invention.
Figure 3:
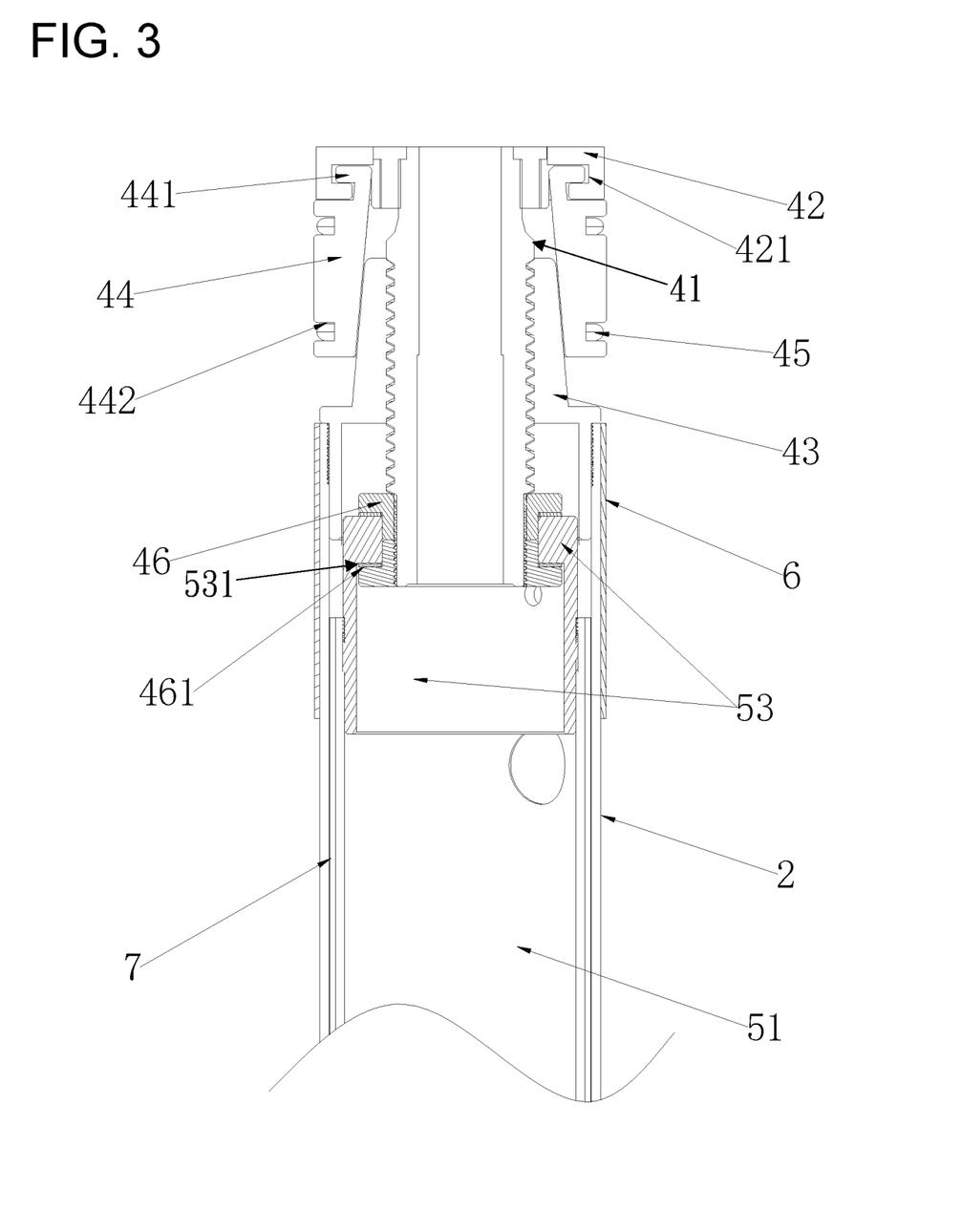
FIG. 3 is a cross-section view of a locking control mechanism in some embodiments of the present invention.
Figure 4:
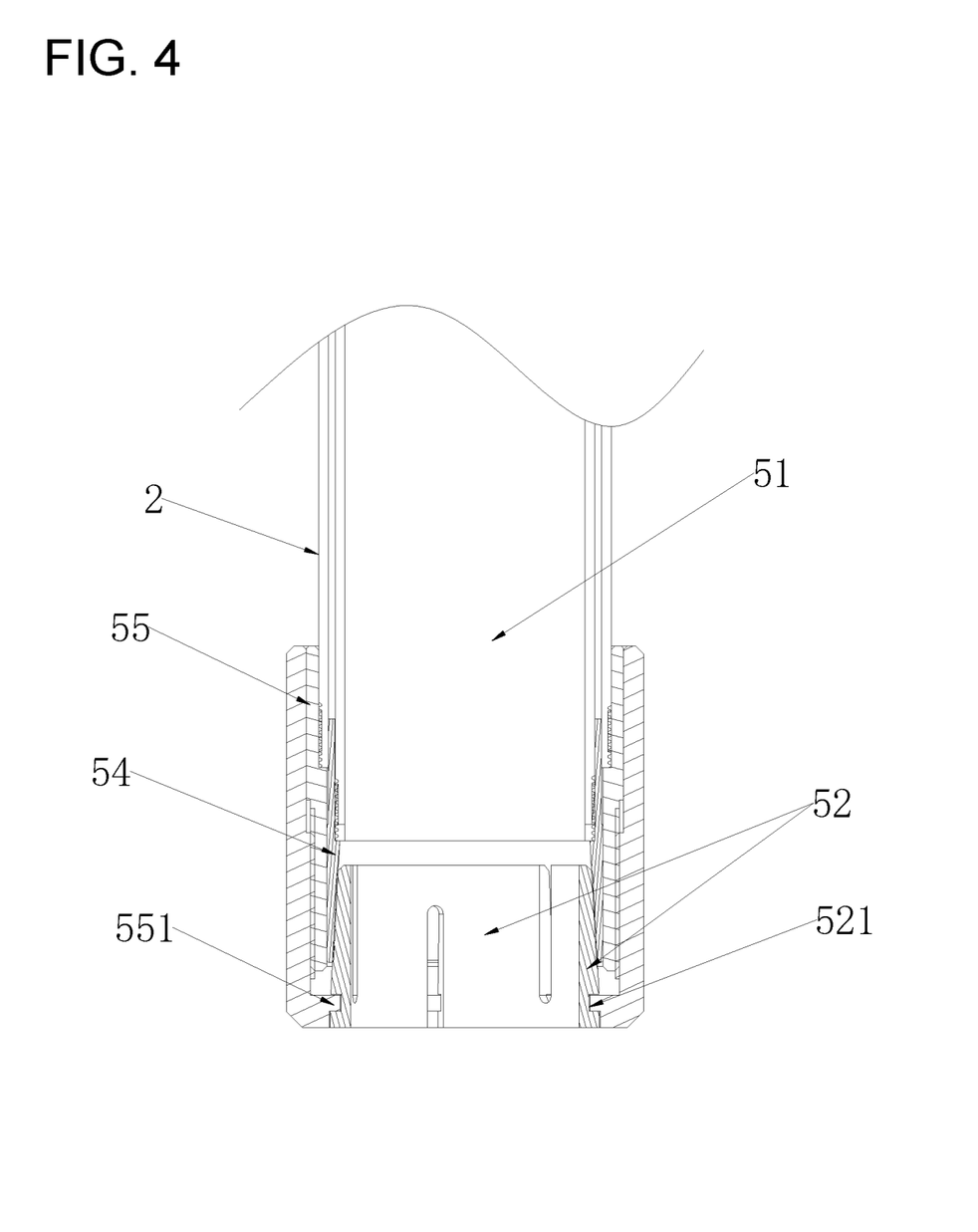
FIG. 4 is a cross-section view of a first clamping mechanism in the embodiment of the present invention.

Referring to FIGS. 1-4, a telescopic support leg as shown in FIGS. 1-4 includes a top leg tube 1, a middle leg tube 2 and a bottom leg tube 3 that are arranged sequentially from outside to inside and are axially telescopic. The middle leg tube 2 and the top leg tube 1 are relatively circumferentially secured, and the locking control component 9 may be installed at one end of the top leg tube 1 and may include a rotating rod with one end extending into the top leg tube 1. In some embodiments, the first locking component 4 may include a movable tube 41, the limiting plate 42, the inner brace 43, and the support brace 44 in the leg tube 1; the movable tube 41 is connected to the rotating rod, and is circumferentially fixed and relatively axially slid with the rotating rod; the limiting plate 42 is fixed on the outer periphery of the movable tube 41; an inner brace 43 may be fixedly connected to the middle leg tube 2 and is connected to the outer periphery of the movable tube 41 via threads. In some embodiments, the support brace 44 may be axially secured relative to the limiting plate 42 and may be located outside the inner brace 43. Under the action or force of the inner brace 43, the support brace 44 may be a tighten state of tightening the inner wall of the top leg tube 1 and in a loose state of being separated from the inner wall of the top leg tube 1.

In some embodiments, a second locking component 5 may include an inner tube 51 that may be relatively axially connected to the movable tube 41 and located inside the middle leg tube 2. In some embodiments, an elastic member 45 that is sleeved on the outer periphery of the bottom leg tube 3 and securely connected to the elastic sleeve 52 of the middle leg tube 2. When the inner tube 51 and the elastic sleeve 52 move relative to each other in the axial direction, the elastic sleeve 52 may be in a locking state that partially extends into the inner tube 51 to lock on the outer wall of the bottom leg tube 3, and may be separated from the inner tube 51 to release into a loosen state of the bottom leg tube 3.

In some embodiments, the telescopic support leg may be axially telescopic and may be relatively circumferentially fixed top leg tube 1, a middle leg tube 2 and a bottom leg tube 3. In one aspect, the top leg tube 1, the middle leg tube 2 and the bottom leg tube 3 may not move relatively to each other during relative extension and contraction. The first locking component 4 may rotate the rotating rod to move the inner brace 43 up and down relative to the support brace 44 and the movable tube 41, thereby causing the support brace 44 to move up and down relative to the inner brace 43 while the inner wall of the top leg tube 1 is tighten to a position of the middle leg tube 2 or separate from the inner wall of the top leg tube 1 to loosen the lock of the middle leg tube 2. In some embodiments, the middle leg tube 2 is secured with the inner brace 43 while connecting to the inner tube 51 axially to the movable tube 41, and the middle leg tube 2 may move up and down relative to the inner tube 51, thereby driving the elastic sleeve 52 that is set on the outer periphery of the bottom leg tube 3 and may be fixedly connected to the middle leg tube 2. By moving up and down relative to the inner tube 51, the elastic sleeve 52 may lock the outer wall of the bottom leg tube 3 under the action of the inner tube 51 or may separate the elastic sleeve 52 from the inner tube 51 to loosen the bottom leg tube 3. With this arrangement, just by turning the rotating rod, the first locking component 4 and the second locking component 5 may lock and secure the middle leg tube 2 and the bottom leg tube 3 respectively at the same time, or loosen and release the middle leg tube 2 and the bottom leg tube 3 at the same time, with which the support legs can be released and fixed with one turn, which is simple to operate and effectively improves the telescopic adjustment speed of the support legs.

In one embodiment, the inner brace 43 may include a cone-shaped segment, and the outer wall of the cone segment has an outer tapered slope. The support brace 44 includes two independent inner support blocks, and the inner wall of the inner support block has an inner cone. The outer tapered bevel matches the inner tapered bevel. With this arrangement, the inner conical slope of the inner wall of the inner support block and the outer conical slope of the outer wall of the conical segment may make the friction force of the inner brace 43 smaller when moving up and down relative to the inner support block, thereby ensuring that the inner brace 43 moves to the inner support block. The inner support block may be squeezed and abutted against the inner wall of the top leg tube 1 or loosen so that the inner support block may be separated from the inner wall of the top leg tube 1 more smoothly.

In yet another embodiment, two annual slots 441 may be disposed at the outer wall of the inner support block, and each annular slot 441 may include an elastic member 45 that elastically supports between the inner support block and the outer wall of the top leg tube 1. In some embodiments, by providing the elastic member 45, the inner support block may be kept in a tightened state separated from the inner wall of the top leg tube 1 when it is not squeezed.

In one embodiment, the inner wall of the limiting plate 42 may be provided with an annular groove 421, and the support brace 44 may be provided with a buckle 442 that extends into the annular groove 421. In one embodiment, the buckle 442 may be in contact with the side wall of the annular groove 421 to cooperatively to achieve relative axial fixation with the limit plate 42. With this arrangement, the support brace 44 may rotate within the annular groove 421 of the limiting plate 42, and the support brace 44 may be limited through the annular groove 421.

In another embodiment, the inner brace 43 also includes a cylindrical section or segment, which extends into the middle leg tube 2 and is fixedly connected to the middle leg tube 2. In one embodiment, a first anti-slip component 6 fixed on the outer wall of the cylindrical section and the outer wall of the middle leg tube 2 and the first anti-slip component 6 fixed on the inner wall of the top leg tube 1. The first anti-slip component 6 is provided with the first anti-slip groove matched with the first anti-slip component 6 so that the middle leg tube 2 may be limited by the first anti-slip component 6 to ensure that the middle leg tube 2 not moving or sliding when it telescopically moves relative to the top leg tube 1.

In one embodiment, the outer periphery of the lower end of the movable tube 41 is fixedly connected to the limit turning piece 46. The outer periphery of the limit turning piece 46 may include an annular limit groove 461. The upper end of the inner tube 51 may be connected to an inner tube connector 53, and it may be provided with a limit block 531 that extends into the annular limit groove 461 to achieve relative axial fixation with the limit turning piece 46. With this arrangement, the inner tube 51 may be limited by the limiting turning piece 46 to prevent the inner tube 51 from being displaced along with the middle leg tube 2.

In one embodiment, the second anti-slip component 7 may be fixed on the outer wall of the inner tube connector 53 and the outer wall of the inner tube 51 fixed on the inner wall of the middle leg tube 2. The second anti-slip component may be provided with a second anti-slip groove that matches the second anti-slip component. With this arrangement, the inner tube 51 may be limited by the second anti-slip component to ensure that the inner tube 51 is relative to the middle leg tube 2 so as to avoid left or right sliding when performing telescopic movements.

In one embodiment, a locking sleeve 54 may be fixedly connected to the outer wall of the lower end of the inner tube 51. The inner wall of the locking sleeve 54 may be provided with an inner inclined guide surface. In some embodiments, the outer wall of the elastic sleeve 52 may be provided with an outer inclined guide surface. The inner inclined guide surface may match to the outer inclined guide surface. With this arrangement, the friction force when the middle leg tube 2 moves up and down relative to the locking sleeve 54 may be smaller through the inner inclined guide surface of the inner wall of the locking sleeve 54 and the outer inclined guide surface of the outer wall of the elastic sleeve 52, thereby ensuring that the inner brace 43 may squeeze and contact the inner support block against the inner wall of the top leg tube 1 or loosen it so that the inner support block may be separated from the inner wall of the top leg tube 1 more smoothly.

In one embodiment, the third anti-slip component may be fixed on the outer wall of the bottom leg tube 3 and it may be fixed on the inner wall of the inner tube 51. A third anti-slip groove may be provided that matches the third anti-slip component. With this arrangement, the bottom leg tube 3 may be limited by the third anti-slip component to ensure that the bottom leg tube 3 telescopically moves relative to the inner tube 51 without left and right sliding.

In one embodiment, the elastic sleeve 52 may be made of a plastic part. The outer wall of the plastic part may be provided with an annular slot 521. The lower end outer wall of the middle leg tube 2 may be fixedly connected with a connecting sleeve 55. The lower end of the inner wall of the connecting sleeve 55 may be provided with an annular groove 521. The connecting sleeve 551 in the annular groove 521 cooperates with the side wall of the annular groove 521 to achieve relative axial fixation with the plastic part. In one aspect, a notch may be provided on the side wall of the plastic part, and the notch may extend from the middle of the side wall of the plastic part to the end of the side wall.

In one embodiment, two flat outer walls may be provided on the outer walls on opposite sides of the rotating rod. The shape of the inner peripheral wall of the movable tube 41 matches the shape of the outer wall of the rotating rod. This arrangement ensures that when the rotating rod rotates, the movable tube 41 follows the rotation of the rotating rod. The rotating rods rotate synchronously.

In one embodiment, it also includes an installation sleeve 91 and a latch 92 that is rotatably connected to the installation sleeve 91 and connected to the locking control component 9. The top leg tube 1 is fixedly connected to the installation sleeve 91. Specifically, the locking control assembly 9 includes a rotating shaft fixedly connected to the pull button 92 and rotationally provided on the mounting sleeve 91, a driving gear fixed on the rotating shaft, a bidirectional spur gear block meshing under the driving gear, and a bidirectional spur gear block. A driven gear that is meshed and connected to a rotating shaft.

In one embodiment, the driven gear may be fixedly connected to the rotating rod through a connecting plate. An anti-rotation groove may be provided on the side wall of the connecting plate. The mounting sleeve 91 may be provided with a mounting plate that is telescopic relative to the connecting plate. The mounting plate is fixed with an anti-rotation groove. The anti-rotation block may be matched with the anti-rotation groove. The end of the anti-rotation block away from the anti-rotation groove may be provided with a return spring that abuts against the inner wall of the installation sleeve 91. With this arrangement, the spring stress may be used to move the mounting base forward and backward relative to the connecting plate, and at the same time, and the anti-rotation block may be correspondingly engaged in the anti-rotation groove, thereby preventing the rotating rod from rotating and preventing the rotating rod from rotating in the locked state. When it is necessary to telescopically adjust the telescopic legs, the mounting plate may be pushed toward the anti-rotation block so that the anti-rotation block exits the anti-rotation groove, thereby ensuring smooth adjustment of the support legs.

In summary, this telescopic support leg may be provided with a top leg tube 1, a middle leg tube 2 and a bottom leg tube 3, which are axially telescopic and relatively circumferentially fixed. The top leg tube 1 and the middle leg tube 2 and the bottom leg tube 3 may not rotate relative to each other when they are relatively telescopic. The first locking component 4 rotates the rotating rod to move the inner brace 43 up and down relative to the support brace 44 and the movable tube 41, thereby causing the support brace 44 to move up and down relative to the support brace 44 and the movable tube 41. Under the action of the inner brace 43, the inner wall of the top leg tube 1 may be tightened the position of the middle leg tube 2 or separate from the inner wall of the top leg tube 1 to loosen the lock of the middle leg tube 2. In one embodiment, the middle leg tube 2 and the inner brace 43 may be fixedly connected, and the inner tube 51 may be axially fixedly connected to the movable tube 41, and the middle leg tube 2 may move up and down relative to the inner tube 51, thereby driving the sleeve to set on the outer periphery of the bottom leg tube 3 and fixed with the middle leg tube 2. In some embodiments, the connected elastic sleeve 52 moves up and down relative to the inner tube 51, so that the elastic sleeve 52 locks the outer wall of the bottom leg tube 3 under the action of the inner tube 51 or separates the elastic sleeve 52 from the inner tube 51 to loosen the bottom leg tube 3. With this arrangement, just by turning the rotating rod, the first locking component 4 and the second locking component 5 may lock and fix the middle leg tube 2 and the bottom leg tube 3 respectively at the same time, or loosen and release the middle leg tube 2 and the bottom leg tube 3 at the same time with which the support legs may be released and fixed with one turn, which is simple to operate and effectively improves the telescopic adjustment speed of the support legs.

Obviously, the above embodiments are only examples for clarity, and do not qualify the embodiment. For ordinary people skilled in the art, other different forms of change or change can be made on the basis of the above description. There is no need and cannot be exhaustive of all implementations. The apparent change or variation derived therefrom remains within the scope of protection created by the present application.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

The invention claimed is:

1. A telescopic support leg comprising:
   a top leg tube, a middle leg tube and a bottom leg tube, wherein the top leg tube, the middle leg tube and the bottom leg tube are relatively circumferentially fixed while extending or contracting telescopically;
   a locking control assembly installed at one end of the front leg tube comprises a rotating rod with one end extending into the front leg tube and being rotatable;
   a first locking component comprises a movable tube, a limiting plate, an inner brace, and a support brace located in the front leg tube; wherein the movable tube is connected to the rotating rod, and is circumferentially fixed and axially sliding relative to the rotating rod;
   wherein the limiting plate is fixed on an outer periphery of the movable tube;
   wherein the limiting plate comprises an annular groove;
   wherein the inner brace is fixedly connected to the middle leg tube via threads connected to the outer circumference of the movable tube;

wherein the support brace and the limiting plate are relatively axially fixed and disposed outside the inner brace;
wherein the support brace supporting the inner wall of the front leg tube under the action of the inner brace and is in contact with the inner wall of the front leg tube to provide a locking state or a loosen state;
wherein the support brace comprises a buckle extending into the annular groove;
wherein the buckle is in contact with the annular groove;
a second locking component comprises an inner tube relatively axially fixedly connected to the movable tube and located inside the middle leg tube, and is sleeved on the rear section;
an elastic sleeve is disposed around an outer circumference of the leg tube and is fixedly connected to the middle leg tube;
when the inner tube and the elastic sleeve move relative to each other in the axial direction, the elastic sleeve is in the locking state that partially extends into the inner tube to lock on the outer wall of the rear leg tube, and is separated from the inner tube to release the rear leg tube in the loosen state.

2. The telescopic support leg of claim 1, wherein the inner brace comprises a cone section, and an outer wall of the cone section comprises an outer conical slope; and
wherein the support brace comprises at least two mutually independent inner support blocks, wherein an inner wall of the support blocks comprises an inner tapered bevel, and an outer tapered bevel matches the inner tapered bevel.

3. The telescopic support leg of claim 1, wherein the support brace comprises an annular slot, wherein the annular slot comprises an elastic member supporting between the support brace and the outer wall of the top leg tube.

4. The telescopic support leg of claim 1, wherein the inner brace comprises a cylindrical section, wherein the cylindrical section extends into the middle leg tube and is fixedly connected to the middle leg tube.

5. The telescopic support leg of claim 1, wherein an outer periphery of a lower end of the movable tube is fixedly connected to a limit turning piece; wherein the outer periphery of the limit turning piece comprises an annular limit groove; wherein an upper end of the inner tube is connected to an inner tube connector, wherein the inner tube connector is connected to a limit block extending into the annular limit groove.

6. The telescopic support leg of claim 1, wherein a locking sleeve is fixedly connected to an outer wall of the lower end of the inner tube, wherein the locking sleeve comprises an inner inclined guide surface; wherein an outer wall of the elastic sleeve comprises an outer inclined guide surface; and wherein the inner inclined guide surface matches to the outer inclined guide surface.

7. The telescopic support leg of claim 1, wherein an outer wall of the elastic sleeve comprises an annular slot;
wherein a lower end of the outer wall of the middle leg tube is fixedly connected with a connecting sleeve, wherein the lower end of the inner wall of a connecting sleeve extending to the annular groove; and
wherein the connecting sleeve and the annular groove cooperates with a side wall of the annular groove to achieve relative axial fixation with the elastic sleeve.

8. The telescopic support leg of claim 1, wherein the elastic sleeve comprises a notch on the side wall, wherein the notch extends from middle of the side wall of the elastic sleeve to an end of the side wall.

9. The telescopic support leg of claim 1, further comprising a first anti-slip component disposed between the top leg tube and the middle leg tube;
further comprising a second anti-slip component disposed between the middle leg tube and the inner tube; and
further comprising a third anti-slip component disposed between the bottom leg tube and the inner tube.

10. A telescopic support leg comprising:
a top leg tube, a middle leg tube and a bottom leg tube, wherein the top leg tube, the middle leg tube and the bottom leg tube are relatively circumferentially fixed while extending or contracting telescopically;
a locking control assembly installed at one end of the front leg tube comprises a rotating rod with one end extending into the front leg tube and being rotatable;
a first locking component comprises a movable tube, a limiting plate, an inner brace, and a support brace located in the front leg tube;
wherein the movable tube is connected to the rotating rod, and is circumferentially fixed and axially sliding relative to the rotating rod;
wherein the limiting plate is fixed on an outer periphery of the movable tube;
wherein the inner brace is fixedly connected to the middle leg tube via threads connected to the outer circumference of the movable tube;
wherein the support brace and the limiting plate are relatively axially fixed and disposed outside the inner brace;
wherein the support brace supporting the inner wall of the front leg tube under the action of the inner brace and is in contact with the inner wall of the front leg tube to provide a locking state or a loosen state;
a second locking component comprises an inner tube relatively axially fixedly connected to the movable tube and located inside the middle leg tube, and is sleeved on the rear section;
an elastic sleeve is disposed around an outer circumference of the leg tube and is fixedly connected to the middle leg tube;
when the inner tube and the elastic sleeve move relative to each other in the axial direction, the elastic sleeve is in the locking state that partially extends into the inner tube to lock on the outer wall of the rear leg tube, and is separated from the inner tube to release the rear leg tube in the loosen state;
wherein an outer periphery of a lower end of the movable tube is fixedly connected to a limit turning piece;
wherein the limit turning piece comprises an annular limit groove;
wherein an upper end of the inner tube is connected to an inner tube connector, and
wherein the inner tube connector is connected to a limit block extending into the annular limit groove.

11. The telescopic support leg of claim 10, wherein the inner brace comprises a cone section, and an outer wall of the cone section comprises an outer conical slope; and
wherein the support brace comprises at least two mutually independent inner support blocks, wherein an inner wall of the support blocks comprises an inner tapered bevel, and an outer tapered bevel matches the inner tapered bevel.

12. The telescopic support leg of claim 10, wherein the support brace comprises an annular slot, wherein the annular slot comprises an elastic member supporting between the support brace and the outer wall of the top leg tube.

13. The telescopic support leg of claim 10, wherein the limiting plate comprise an annular groove;
   wherein the support brace comprises a buckle extending into the annular groove;
   wherein the buckle is in contact with a side wall of the annular groove.

14. The telescopic support leg of claim 10, wherein the inner brace comprises a cylindrical section, wherein the cylindrical section extends into the middle leg tube and is fixedly connected to the middle leg tube.

15. The telescopic support leg of claim 10, wherein a locking sleeve is fixedly connected to an outer wall of the lower end of the inner tube, wherein the locking sleeve comprises an inner inclined guide surface; wherein an outer wall of the elastic sleeve comprises an outer inclined guide surface; and wherein the inner inclined guide surface matches to the outer inclined guide surface.

16. The telescopic support leg of claim 10, wherein an outer wall of the elastic sleeve comprises an annular slot;
   wherein a lower end of the outer wall of the middle leg tube is fixedly connected with a connecting sleeve, wherein the lower end of the inner wall of a connecting sleeve extending to the annular groove; and
   wherein the connecting sleeve and the annular groove cooperates with a side wall of the annular groove to achieve relative axial fixation with the elastic sleeve.

17. The telescopic support leg of claim 10, wherein the elastic sleeve comprises a notch on the side wall, wherein the notch extends from middle of the side wall of the elastic sleeve to an end of the side wall.

18. The telescopic support leg of claim 10, further comprising a first anti-slip component disposed between the top leg tube and the middle leg tube;
   further comprising a second anti-slip component disposed between the middle leg tube and the inner tube; and
   further comprising a third anti-slip component disposed between the bottom leg tube and the inner tube.

* * * * *